Sept. 13, 1938.   M. L. NELSON   2,129,743
AUTOMATIC AUDITING AND TABULATING SYSTEM
Filed May 7, 1928   5 Sheets-Sheet 3

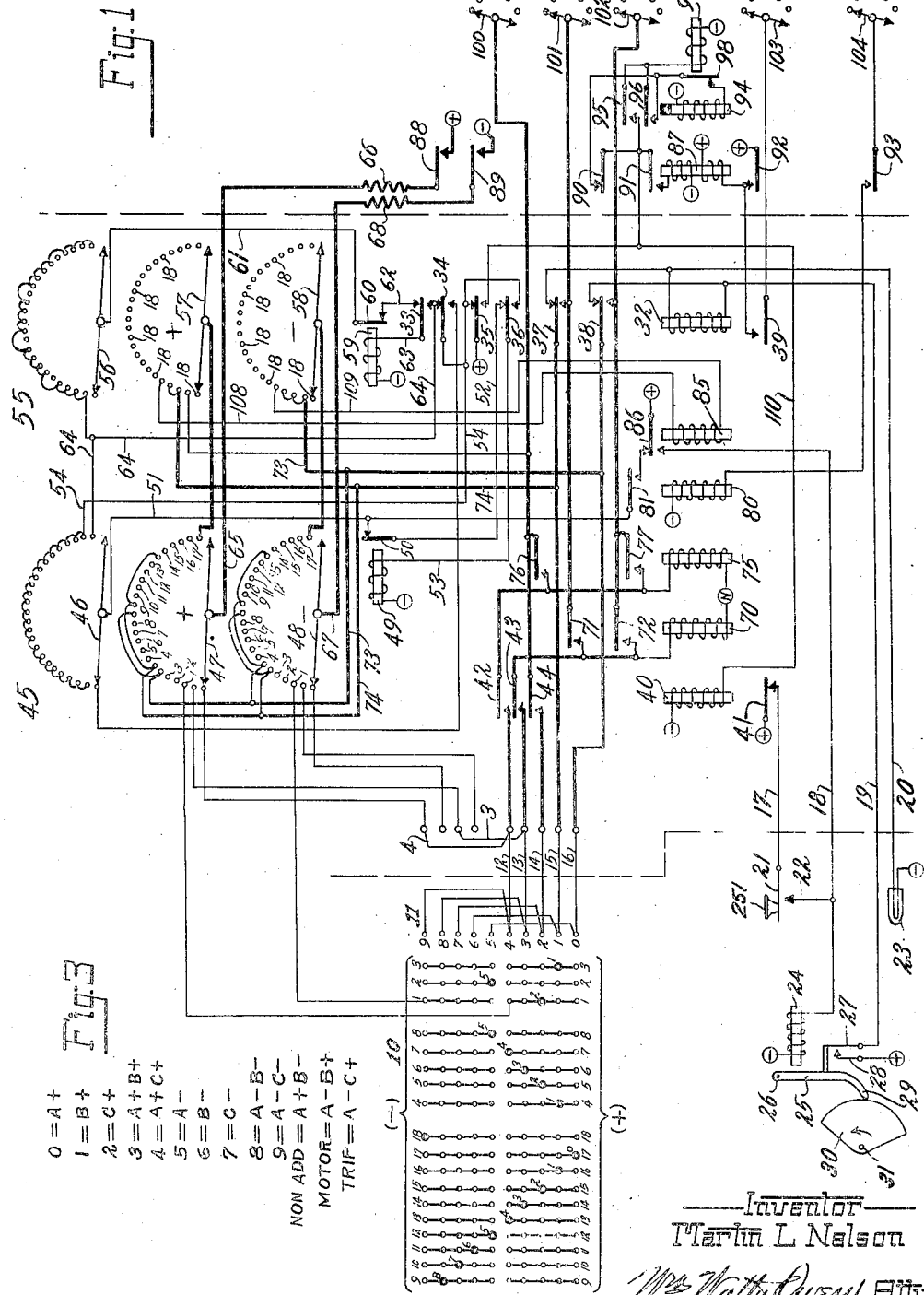

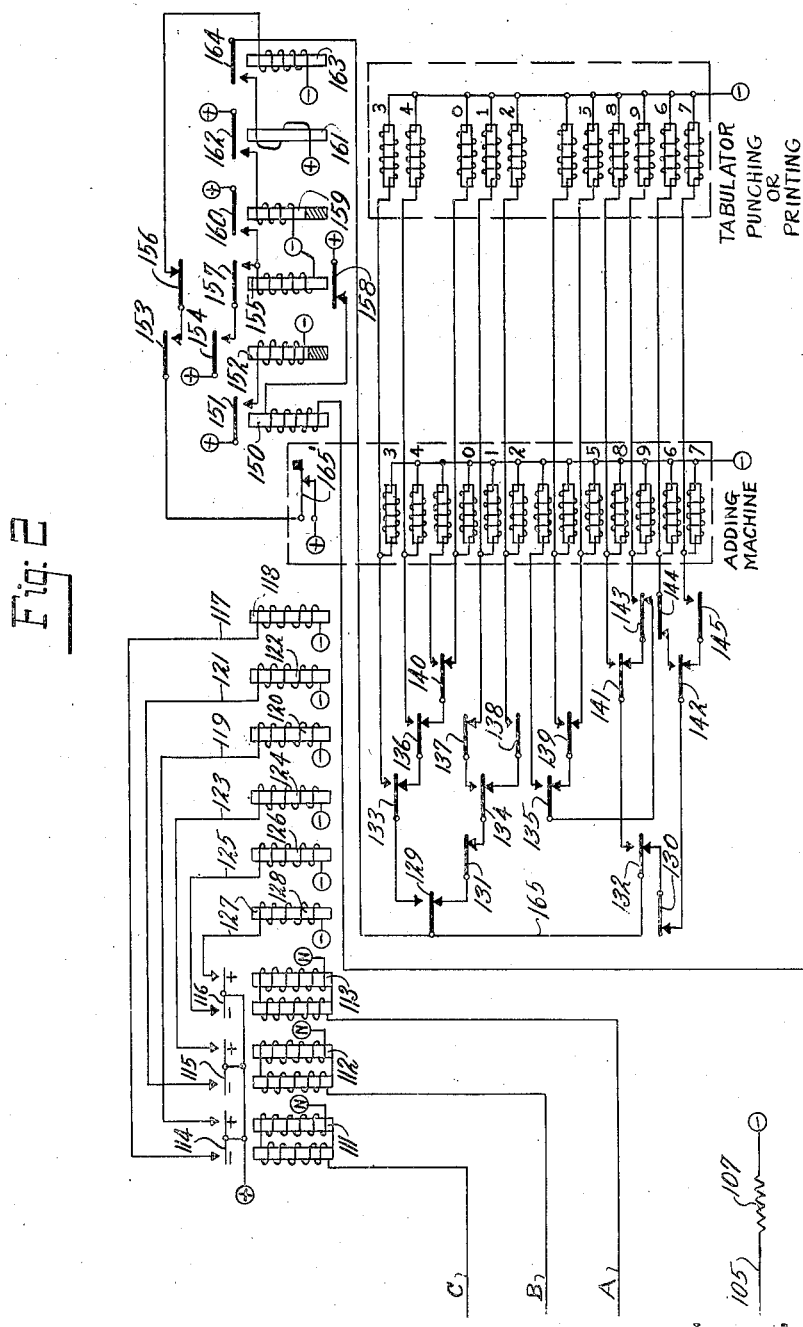

Inventor
Martin L. Nelson

Sept. 13, 1938.   M. L. NELSON   2,129,743
AUTOMATIC AUDITING AND TABULATING SYSTEM
Filed May 7, 1928   5 Sheets-Sheet 4
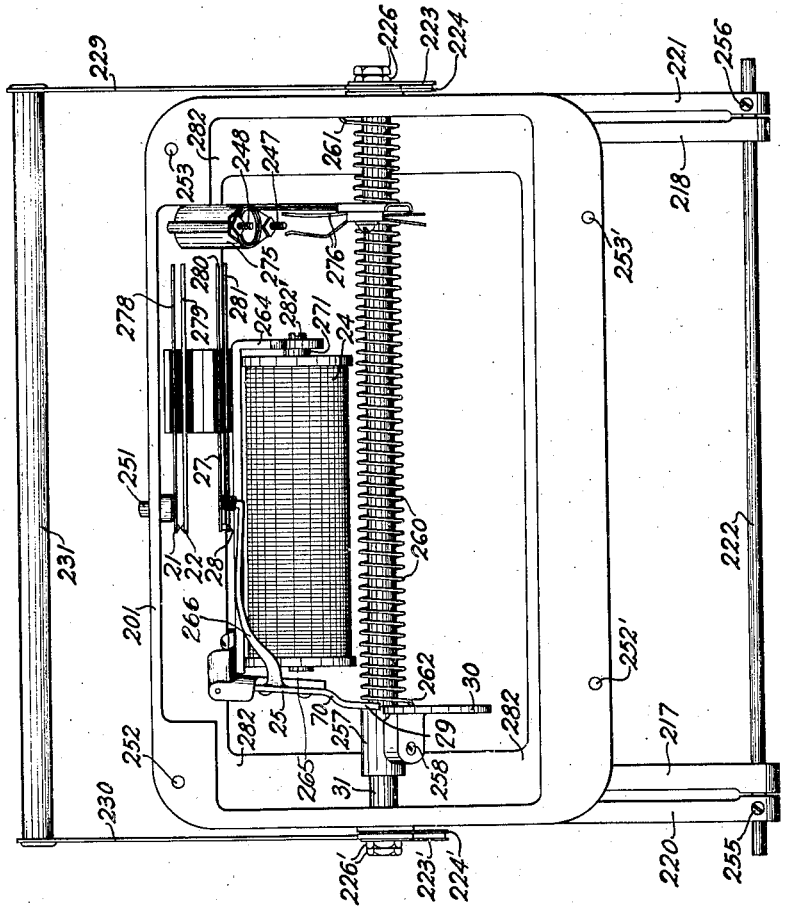
Inventor
Martin L. Nelson Sept. 13, 1938.  M. L. NELSON  2,129,743
AUTOMATIC AUDITING AND TABULATING SYSTEM
Filed May 7, 1928  5 Sheets—Sheet 5
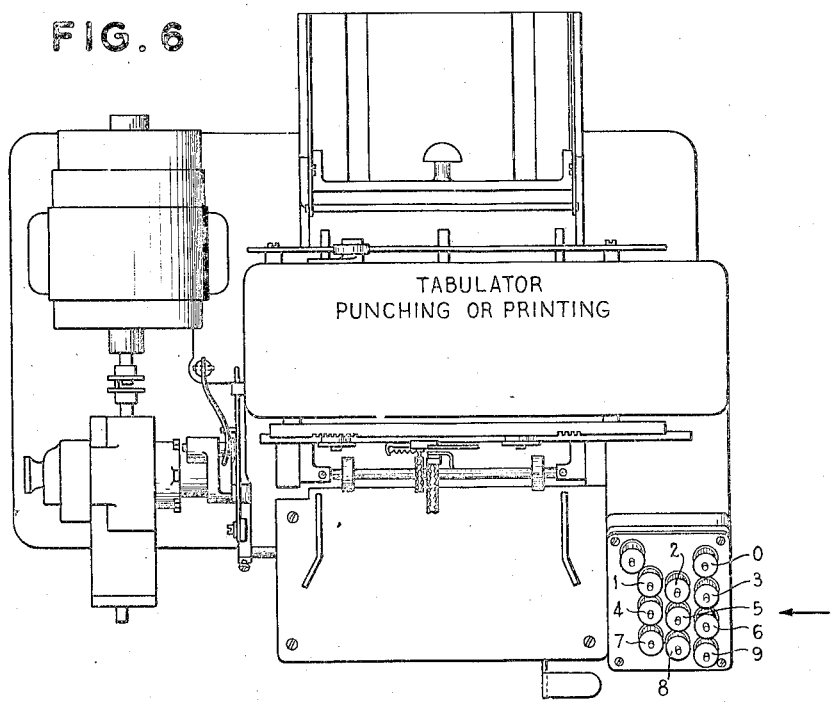
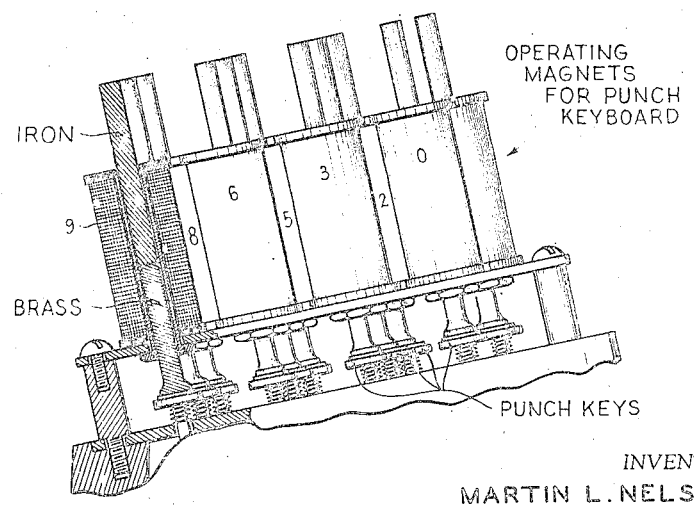
INVENTOR.
MARTIN L. NELSON
BY
ATTORNEY.

Patented Sept. 13, 1938

2,129,743

UNITED STATES PATENT OFFICE 2,129,743

AUTOMATIC AUDITING AND TABULATING SYSTEM

Martin L. Nelson, Park Ridge, Ill., assignor, by mesne assignments, to Associated Electric Laboratories, Inc., Chicago, Ill., a corporation of Delaware Application May 7, 1928, Serial No. 275,643

50 Claims. (Cl. 178—3)

The present invention relates to an auditing and merchandise control system for use in department stores or other places where sales of gooods are effected.

At the present time there are two serious problems confronting all department stores. These are, first, the development of some new method of sales audit which is simpler than the methods now in vogue, and at the same time less expensive; second, the development of some method of merchandise control which can be dovetailed with the sale audit.

There are on the market statistical machines, such as the Hollerith and the Powers, which are capable of giving a rapid and mechanically accurate audit from punched cards. However, the difficulty has been the time and expense involved in the preparation of these cards. The machines therefore seem to stop just short of providing the solution to these problems. It is obvious that if economical means can be provided for automatically punching the cards simultaneously with the recording of the sales by the sales person or cashier, then the key to the solution of the problem is obtained.

The system disclosed in the present application represents a solution to the problems intimated above. The routine for recording a sale is very simple. When a sales person has consummated a sale, he removes a tag from the merchandise sold and inserts the tag into a circuit-closer called a transmitter together with the other identification markers desired. Immediately the information is thereby transmitted automatically to a central office, duplicating there on a single card the information contained on the merchanlise display tag and on the other identification markers inserted by the sales person into the transmitter. At the same time, in the central office, the amount of the sale is automatically recorded and added to the amount of the previous business of the day. This is achieved by automatically controlling a tabulating machine which furnishes the punched or printed card simultaneously with an adding machine which records the sales and other information on a tape. Although the tabulating machine is generally described as a punching device, it should be understood that a printing machine may as well be used, if desired.

By the application of tabulating equipment, in conjunction with the devices shown in this application, the following results can be obtained, and this at a lower cost than is now being paid for information which is less promptly obtained and much less complete.

1. Continuous sales total and an automatic sales audit, which eliminates the necessity of flash reports;
2. No possibility of missing sales checks;
3. Automatically punched card records for an analysis by any predetermined segregation, e. g., analysis by departments; analysis by sales persons; analysis by items of merchandise; analysis by cash, charge account, or C. O. D.;
4. A positive merchandise control of sales audit and mark down and visible follow-up of slow moving items;
5. Perpetual unwritten inventory and merchandising analysis practically synchronous with sales;
6. Ease of taking statistical inventory;
7. Definite identification of missing items at physical inventory check-up;
8. Time saved for sales person and customer in recording sales;
9. Automatic billing of charge accounts;
10. Reduction of non-productive office space.

A general account of the equipment used and of the operation involved will now be given.

For this purpose it will be assumed that the system disclosed in the present application is used in a department store. The equipment consists, generally stated, of a circuit-closer or transmitter; a centrally located control equipment; a plurality of remotely located printing or punching tabulating machines and adding machines; and trunk lines leading from these tabulating and adding machines to switches which are individual to the control equipment mentioned above.

A transmitter is located in the salesroom and the shop assistant has a ticket provided with perforations representing his identity number in the organization; the customer is provided with a similar ticket if he maintains an account, or a ticket is furnished by the cashier should the transaction be on a cash basis; and the article sold bears a similar ticket having perforations which represent the number of the article and its price. This latter ticket may be detached from the usual price tag provided on the respective article. When a sale is transacted, the sales person detaches a perforated ticket from the usual tag which is attached to the merchandise and inserts this ticket in the transmitter. Should the transaction be on a cash basis, the cashier will furnish another perforated ticket designating the character of the sale; however, if the transaction is on a charge account, the customer himself is provided with a perforated marker ticket which he gives to the salesman for insertion into the transmitter. The salesman has a certain ticket which bears suitable perforations designating the status or number of the salesman in the organization. These tickets are attached to the various groups of contacts, and, as will be obvious, the perforations in the various tickets expose certain parts of the contacts arranged stationary in the transmitter. The salesman then operates a handle to move the movable contacts into engagement with the exposed stationary contacts. Thereby, certain combinations are set up in the transmitter. The transmitter is locked in operated position to prevent premature withdrawal of the marker tickets. Should any one of the marker tickets be inserted incorrectly, or should the salesman have forgotten to insert a marker ticket, a signal lamp will light, indicating to the salesman the faulty condition. He thereupon may operate a push button to close a circuit which causes the transmitter to open again so that the salesman may gain access to the marker tickets inserted incorrectly. The error will then be corrected.

Assuming that all the marker tickets have been inserted properly, the centrally located control apparatus will cause the selection of a trunk line leading to an idle punching or printing tabulator machine and to a companion adding machine. Current combinations determined by the marker tickets inserted in the transmitter will now be transmitted over the trunk line to the control equipment of the tabulating machine and of the adding machine. Polarized relays in the control equipment will respond to these current combinations and will control the tabulating machine and the adding machine progressively in such a manner that the tabulating machine produces a single punched card containing all the information contained on the individual marker tickets which have been inserted by the salesman, and at the same time the adding machine produces a record of all this information on a tape.

At the termination of the operations of the tabulating machine and of the adding machine, release mechanism will be actuated in the transmitter which will cause the same to open so that the salesman may withdraw the various marker tickets.

It may be stated at this point, that the tabulating machine may be an ordinary punching machine such as the one known under the name "Powers" and shown in Patent 1,305,557, issued June 3, 1919, and the adding machine may be any suitable adding machine connected to the system as is shown and described in this specification. The difference in operating the tabulating machine and the adding machine resides chiefly therein that both of these machines are actuated simultaneously and automatically instead of manually. Ordinarily, the punched card may be produced on a tabulating machine by actuating a key board in the manner of actuating a typewriter. In the present case the keys which control the various punches are actuated by magnets in a manner similar to that disclosed in Patent 1,271,614, issued July 9, 1918. The operation of the adding machine is similar; instead of operating it manually, the respective keys are actuated by magnets in a manner apparent from the disclosure in Patent 1,271,614, and these magnets are simply connected in multiple to the corresponding magnets of the tabulating machine, so that the two machines operate simultaneously.

In the past, the work indicated above was accomplished by various departments working in co-operation. The information recorded by the clerk and by the cashier was tabulated and recorded graphically by operating a tabulating machine by hand thus uniting the various items of interest connected with each transaction, on a separate punch card. It will be apparent that the loss of one sale's or cashier's ticket affected the total and rendered the system inaccurate. Moreover, the system did not render instantaneous accurate information as to sales-totals, and as to the status of the stock. The system disclosed in the invention represents a decided advance over the old method of sales audit, since it renders instantaneous information relating to a variety of items, such as sales-totals (which are recorded by the adding machine) and since it does away with the staff necessary for the gathering of this information and its co-ordination, the possibility of errors is reduced to a minimum.

The transmitter is located in the salesroom of an organization and is conveniently accessible to one or more cashiers. The operation is simple as the cashier has merely to insert the various tickets and operate a handle to start the automatically controlled apparatus.

The various objects and features of the present invention will be better understood from a detailed description which is yet to follow and which should be read in connection with the accompanying sheets of drawings forming a part of this specification.

Referring now to the drawings, Fig. 1 shows the sending equipment which consists of a number of switches, control relays, and a transmitter. The latter is located so that it is accessible to a sales person and the control equipment may be located somewhere in the salesroom.

Fig. 2 shows a trunk line accessible to a switch which is individual to the control equipment shown in Fig. 1 and which terminates in control equipment in Fig. 2 which is individual to a remotely located adding machine and to a tabulating machine.

Fig. 3 is a schematic representation of the various current combinations which are transmitted to the control equipment of the tabulator and of the adding machine in order to cause the printing and punching of the various figures and the actuation of the control magnets of these machines.

Fig. 5 illustrates details in the interior mechanism of the transmitter. This figure is a bottom plan.

Fig. 6 shows a plan view of the tabulator punching or printing machine, such as shown in Fig. 1 of Patent 1,305,557, with the operating magnets in position for operating the keys of the tabulator punch.

Fig. 7 shows a side view of the operating magnets and keyboard looking in the direction of the arrow in Fig. 6.

Figure 4:
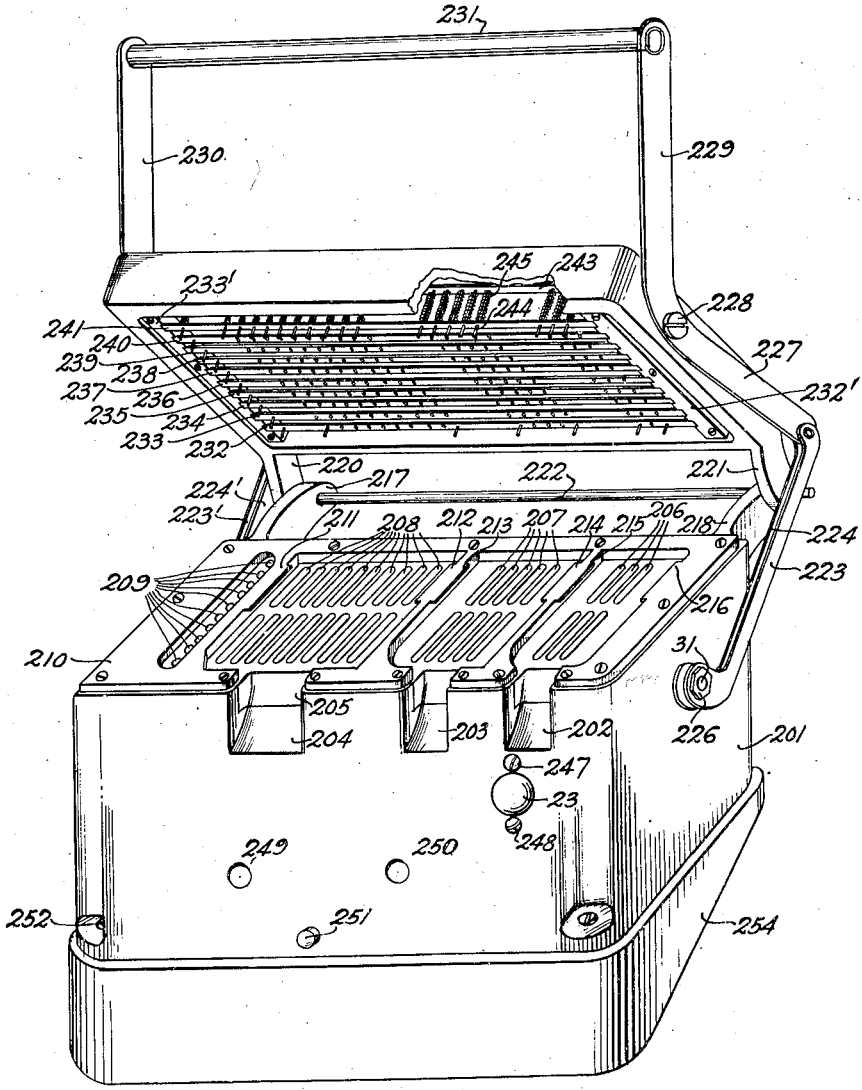
Fig. 4 shows a perspective view of the transmitter with some parts broken away to show the interior mechanism.

The current supply to the various magnets and relays shown in the drawings is indicated by the usual minus and plus symbols in circles, designating the negative and the positive poles of a battery. It will be understood that a plurality of current sources has been shown by these symbols merely for the sake of conveniently describing the apparatus and its operation; in reality, only one battery is used, which is tapped at the mid point. This normal mid point tap is designated in the drawings by the reference character N set in a circle. The minus pole of the battery will be referred to as "battery" and the plus pole will be referred to as "ground".

The detailed description will now be proceeded with.

Referring now specifically to Fig. 4, the transmitter 10 comprises a stationary casing, which carries an insulating plate 205 made of suitable insulating material such as "bakelite" and cast into it may be a plurality of groups of elongated strips of oppositely located contacts such as the groups designated by numerals 206, 207, and 208. Each group of contacts, as is shown, consists of two oppositely located rows of these elongated strips. At the left side is shown a separate group of individual contacts which are designated by numeral 209. The purpose of the various groups of contacts will be described later. Fastened to the top of the casing 201 is a plate 210 which has openings corresponding to the various groups of contacts as shown. The casing is also provided with notches designated 204, 203, 202, and the above mentioned plate is provided with projections or flanges 211, 212, 213, 214, 215 and 216. These notches and the projections in the plate 210 are provided for conveniently inserting marker tickets which may be made of insulating material and which are provided with a plurality of perforations representing certain combinations.

The specific structure and the purpose of these marker tickets will be described next.

A transmitter as the one shown and described in the present specification is located accessible to the cashier. The sales clerk has a marker ticket with the perforations representing his number in the organization and which may be inserted into the opening of the plate 210 which embraces the contact group 206. It will be seen that this opening has one rounded corner. The marker ticket which is individual to the sales clerk fits exactly into this opening and is slipped below the projections 215 and 216 on the plate 210. If the customer happens to maintain an account, he is provided with a marker ticket which fits into the opening of the plate 210 embracing the contact group designated 207. This opening again is provided with a rounded corner and with projections 213 and 214 for holding the marker ticket securely in place. Should the transaction be on a cash basis, the marker ticket necessary for insertion into the corresponding opening is furnished by the cashier. This marker ticket, it will be understood, has perforations which designate the particular character of the transaction, that is to say, the nature of the transaction whether conducted on a cash basis or on a charge account. The article sold is provided with the usual price tag to which is attached a marker ticket which may be inserted into the opening embracing the contact group comprising contacts 208. This marker ticket again is provided with perforations which represent the identification number of the article and its price. The size and form of the various marker tickets described above is determined by the form and size of the openings in the case 210. The perforations in the various marker tickets vary according to the number of the sales clerk, the status of the customer and the article sold. No marker tickets have been shown in the drawings as the above information should suffice to render a clear understanding. For these tickets, see Fig. 1 of Nelson 1,927,556, September 19, 1933. It may be said at this point that the peculiar form of the marker tickets excludes the possibility of inserting them wrongly. Should any of the tickets be inserted incorrectly, it would protrude beyond the edge of the cage 210 and a correct closure of the apparatus would be impossible. In this case a circuit will be closed to light the lamp 23 to indicate to the cashier that one or all of the marker tickets are inserted incorrectly. For this eventuality a button 251 is provided which when depressed causes the transmitter to open again, thus rendering access to the marker tickets and permitting the cashier to rectify the error.

The row of individual contacts 209 has the purpose of establishing connection for the various combinations set up by the marker tickets in cooperation with the movable contacts provided in the companion casing rotatably pivoted on the shaft 222.

Referring now to the companion casing, it will be seen that the same is pivoted by means of projections 220 and 221 on shaft 222 which in turn is pivoted on the projections 217 and 218 on the stationary casing 201. A shaft 31 extends through the stationary casing 201 and projects on both sides where it receives the arms 223, 224, 223' and 224'. These arms, as will be seen, are attached to the shaft 31, by means of nuts such as 226. The arms 223, 224, 223' and 224' are movably attached to operating levers 229 and 230, which in turn are rotatably fastened to the companion casing by means of screws such as 228. A handle 231 is provided for operating the companion casing into connection with the stationary casing.

Mounted in the companion casing are two strips of insulating material 232' and 233'. These strips support ten metal strips 232 to 241, inclusive. Each of these metal strips has a companion metal strip such as the one designated by numeral 243 which is individual to the metal strip 241. Between these various pairs of metal strips are mounted individually movable contact pins 244 as shown between strips 241 and 243. Each of these contact pins is provided with a shoulder which rests against the lower metal strip and each of these pins is held in normal position by means of a spring such as 245. Only a few of these pins are shown in order to keep the drawings as clear as possible.

It will be seen that the contact pins in the companion casing are arranged in groups and adapted to make contact with the corresponding groups of contact strips in the stationary casing 201. Each group comprises a number of conductively connected contact pins, and rows of ten such pins are located adjacent to each other so that a total of ten pins is adapted to engage two oppositely located contact strips in the stationary casing.

The operation of the transmitting device is as follows.

When a sales person transacts a sale, he inserts his own marker ticker into the opening of plate 210 embracing the group of contact strips 206 in the stationary casing; a second marker ticket rendered either by the customer or by the cashier is inserted into the opening embracing the group of contact strips 207; and a third marker ticket which is detached from the usual price tag on the article sold is inserted into the opening in the cage 210 which embraces the group of contact strips 208. Each of these marker tickets is provided with a plurality of perforations which expose certain of the strips in the respective groups at certain points. The cashier then operates the handle 231, thereby lowering the companion casing containing the movable contact pins. It will be evident that only those contact pins can establish contact with the corresponding contact strips in the plate 205, as is determined by the perforations in the various marker tickets. A certain combination is thereby set up which determines the operation of the apparatus to transmit to the tabulating machine and to the adding machine such a control as to cause the tabulating machine to reproduce on a single ticket the information furnished by the plurality of tickets inserted by the cashier. The row of movable pins at the left end of the metal strips 232 to 241, inclusive, always establish contact with the corresponding individual contacts in group 209 in the insulating plate 205. This furnishes current to the various metal strips 232 to 241, inclusive, and thereby to the corresponding pins in the metal strips.

When the pins in the companion casing are thus brought into engagement with the contact groups in the stationary casing, a locking mechanism in the interior of casing 201 operates to lock the companion casing in place. When the transmission of the combination set up by the marker ticket is finished the companion casing is automatically released by a mechanism which will be described later.

Assuming, however, that the cashier has neglected to insert one of the marker tickets or inserted one of the marker tickets incorrectly, a circuit will be completed to light the lamp 23, indicating this condition to the cashier. In this case the cashier will depress the button 251, thereby actuating the release mechanism to open the device by releasing the companion casing to the position shown. The cashier may now correct the error by correctly inserting the respective marker tickets and again operate the companion casing into engagement with the stationary casing.

It may be mentioned that the stationary casing 201 is fastened to a base 254 by means of screws which may be inserted through the holes 253 and 252 and 253' and 252' shown in Fig. 5 in the stationary casing. This base 254 may be permanently fastened to a table or bench where the device is located and may contain the cable connections for wiring the apparatus.

Referring now to the drawings shown in Fig. 5, this figure shows the interior mechanism of the transmitter as seen from the bottom of the stationary casing 201. The shaft 31 extends through the casing and is rotatably fastened thereto by means of nuts 226 and 226' holding also the arms 223, 224, 223' and 224'. A cam 30 which is integral with the bushing 257 is fastened to the shaft 31 by means of screw 258. A coiled spring 260 is fastened at one end to the casing at 261 and at its other end to the cam 30 at point 262. This spring exerts a force on the shaft 31 thereby maintaining the companion casing which contains the movable contact pins in a normally open position, as shown in Fig. 4, that is, separated from the stationary casing carrying the groups of contact strips shown in Fig. 4. An electromagnet 24 is fastened to one side of the stationary casing by means of screws which extend through the openings 249 and 250 in Fig. 4. The core 271 of this electromagnet is fastened to a heel piece 264 by means of a screw 282'. The heel piece carries the armature 265 and attached to this armature is a locking arm 25 which has an extension 29. The armature also has an arm 266 which is provided with a bushing, and this bushing is in engagement with a spring 27 of a spring assembly mounted on the heel piece 264. Therefore, the armature 265 and the locking member 29 will have a tendency to assume the position as shown in the drawings, Fig. 5. The assembly is assumed to be in operated position with the pins in the companion casing engaging the contacts in the stationary casing. In this position the cam 30 is locked by means of the extension 29 of the locking device 25 which is attached to the armature 265. Thus the companion casing is locked in operated position.

Assuming that the marker tickets are inserted correctly, the electromagnet 24 will be actuated automatically after the transmission of the combination set up by the marker tickets is completed and will attract the armature 25, thereby withdrawing the extension 29 from the cam 30 on the shaft 31 and releasing the shaft. The companion casing now returns to normal position as shown in Fig. 4 by the force of the coiled spring 260.

Numeral 275 designates a socket for receiving the lamp 23 indicated in Fig. 4. This lamp socket is fastened to the casing by means of screws 247 and 248 and carries contacts 276 which engage the contacts of a lamp inserted into the lamp socket. Those contacts are insulated and mounted on the lamp socket and end in terminals to which wires may be attached for connecting the lamp to the circuit. Assuming now that the cashier has forgotten to insert one of the marker tickets or that he has inserted one of the marker tickets incorrectly, a circuit will be completed to light the lamp 23 to indicate this condition to the cashier. The button 251 may then be pressed to actuate the springs 21 and 22 and to close thereby a circuit for energizing the magnet 24 to attract its armature 25 and to thereby release the cam 30 and with it the companion casing to normal position, so that the assistant may correct the fault.

Referring to Fig. 1, the transmitter is designated by numeral 10. It consists of three groups of oppositely located strips of contacts. The lower half of these contact groups, is connected to correspondingly marked contacts in the middle bank of switches 45 and 55 accessible to wipers 47 and 57; the upper half is connected to correspondingly marked contacts in the lower banks of the switches 45 and 55 accessible to wipers 48 and 58. The wipers 47 and 57 will progressively connect ground to the correspondingly marked contact strips in the lower half of the transmitter, while the wipers 48 and 58 will connect battery to the correspondingly marked contact strips in the upper half of the transmitter. The group of contacts designated 11 which is shown at the right of the last transmitter contact group are individually connected to the central equipment at the right of the dotted line as shown. It may be stated, that the companion movable groups of contacts merely serve the purpose of connecting exposed contacts in the various groups to certain individual contacts in the group marked by numeral 11.

It will be assumed now that a certain sales transaction is completed. The salesman will separate a perforated marker ticket from the usual price tag attached to the merchandise. This marker ticket will be inserted into the transmitter so as to cover the group of contacts shown at the left side of the transmitter and comprising the oppositely located rows of contact strips designated in Fig. 1, left end, by numerals 9 to 18, inclusive. The perforations in this marker ticket are shown prominently by heavy circles which are also designated by numerals. These latter numerals designate the numeric value of the various perforations. If the customer has a charge account he will hand the salesman a marker ticket which will be inserted into the transmitter to cover the oppositly located strips of contacts designated by numerals 4 to 8, inclusive. Again, the perforations in this marker ticket are shown by prominent circles and the numerals pointing to these circles designate the numeric value of the perforations. The salesman himself is provided with a marker ticket which indicates his number in the organization. This last marker ticket will be inserted into the transmitter to cover the group of contacts designated by numerals 1, 2, and 3. The perforations in this marker ticket are again shown by heavy circles and their numeric value is indicated by numerals. The salesman closes the companion plate of the transmitter, after having inserted the marker tickets, thereby locking the tickets in place, and connecting the group of individual contacts marked by numeral 11 horizontally through to the contact strips exposed by the perforations in the various marker tickets attached to the various groups.

The locking mechanism for the transmitter is shown in the left hand lower corner of the drawing, Fig. 1, and is the same mechanism as is shown fully in Fig. 5. It consists of a shaft 31 which carries a cam 30. This shaft is normally maintained under tension by means of a coiled spring and has the tendency to rotate in the direction indicated by the arrow. There is a magnet 24 provided in the housing of the transmitter which has an armature 25 pivoted at point 26. This armature is normally kept in the position as shown in the drawings by the force of a spring 27 which rests against this armature. When the salesman closes the transmitter the cam 30 will move against the tension of the springs in the direction contrary to the direction of the arrow and will lock behind the extension 29 on armature 25. The spring 27 follows the armature 25 and establishes contact with the spring 28 which is connected to ground. An obvious circuit will thereby be completed by way of conductor 19, through the winding of a starting relay 32, conductor 20, lamp 23, to battery. The lamp 23 does not light in series with the resistance of winding 32. Provided that all the tickets have been inserted correctly, the relay 32 will operate and start the mechanism. However, it will be assumed next that the salesman has forgoten to insert a ticket or that he has incorrectly inserted a ticket.

In this case the relay 32 will be short circuited over the horizontally extending contacts with which the lowermost contacts designated 0 and 1 are in engagement when the cover of the transmitter is closed. To explain this operation a little more in detail, when the companion cover of the transmitter is pulled down by the salesman, individual contact bars which extend horizontally will make engagement with the contacts designated 0 to 9, inclusive. These contact bars carry as many individually movable contacts as there are horizontal contacts of all the groups of stationary contacts shown. Now, if it is assumed that the salesman has forgotten to insert his own card, for example, it will be evident that the contacts designated 0 and 1 will be short circuited over either of the bars designated 1, 2 and 3 of the contact group provided for the salesman's marker ticket. Following the conductors 15 and 16 (which now are short-circuited), it will be seen that these conductors terminate in armatures 37 and 38 of relay 32. The resting contacts of these armatures are wired to the two terminals of the winding of the relay 32, thereby short-circuiting this relay. Therefore, relay 32 cannot operate in this case. However, a direct circuit for the lighting of lamp 23 is completed which may be traced from battery, lamp 23, conductor 20, resting contact at armature 37, conductor 15, contact point 1, horizontal bar in the companion cover of the transmitter, a movable contact in this horizontal bar establishing contact with either of the three contact strips in the lower half of the transmitter, in the group reserved for the ticket of the salesman, horizontal contact carrying bar engaging the contact designated 0, conductor 16, armature 38 and its resting contact, conductor 19, springs 27 and 28 to ground.

The lighting of lamp 23 indicates to the salesman that the tickets have not been inserted correctly. He thereupon depresses the push button 21, thereby establishing a circuit for the operation of the release magnet 24 in the transmitter from battery, winding of relay 24, spring 22, spring actuated by push button 21, conductor 17, resting contact and armature 41, ground. Magnet 24 operates and attracts the armature 25, thereby withdrawing the extension 29 and allowing cam 30 and with it the shaft 31 to rotate in the direction indicated by the arrow. The companion cover of the transmitter is thereby opened and the salesman has again access to the tickets and may rectify the error.

Assuming, however, that the tickets have been correctly inserted in the transmitter, upon closing the companion cover, the cam 30 locks behind the extension 29 on armature 25, and the springs 27 and 28 close to complete the circuit for relay 32. Since this relay is not short circuited at this time, it will operate in a circuit which has been traced before. As armature 39 relay 32 closes a circuit for the private wiper 103 by connecting this private wiper to the lower winding of the switching relay 87; at armatures 38 and 37, the connection for the short circuit mentioned above will be disconnected and the conductors 15 and 16 will be directly connected to the wipers 101 and 102 which have access to the conductors A and B of the trunk line leading to the control equipment of an adding machine and a tabulator. At armature 36 the relay 32 prepares a circuit for the rotary magnet 49 which is individual to the switch 45; at armature 35, it completes a circuit from ground, armature 35 and its working contact, conductor 110, winding of relay 40, to battery. Relay 40 operates and attracts its armatures 41 and 44, inclusive. At armature 41, it disconnects ground from the conductor 17 which is connected to the push button 21. It will be apparent that an operation of the push button will not produce any results now since the circuit is opened at armature 41 of relay 40. Therefore, the salesman is prevented from opening the transmitter after the tickets have been correctly inserted. At armatures 42, 43, and 44, the relay 40 connects the conductors 12 and 13 to the windings of relays 70 and 75, respectively, and at armature 44, the conductor 14 is directly connected to the wiper 100 which has access to the conductor C of the trunk line leading to the control equipment of the adding machine and of the tabulating machine.

The next operation of the equipment obviously must be the selection of an idle trunk line such as the one comprising conductors C, B, A, 105 and 106. For this purpose the switch shown in the right hand lower corner of Fig. 1 is provided which comprises the wipers 100 to 104, inclusive. These wipers are adapted to establish connection with the conductors A, B, C, 105 and 106. The conductors A, B, C are the impulse conductors of the system, that is to say, current combinations as listed in the table shown in Fig. 3 may be transmitted over these conductors to operate the equipment shown in Fig. 2, to thereby actuate the adding machine and the tabulator in such a manner as to punch holes on a single card which corresponds to certain numerals and to record these numerals on a tape. For example, when it is desired to transmit numeral 3 to the adding machine and to the tabulating machine, the conductors A and B will be connected to ground; if it is desired to transmit the numeral 4, conductors A and C will be connected to ground; and if it is desired to transmit the numeral 7, only the conductor C will be connected to battery. The various combinations used are listed in Fig. 3 and the operation of the equipment will be described in detail later on.

The switch shown in the right hand lower corner or Fig. 1 also is equipped with a private wiper 103 having access to the conductor 105 of the trunk line, and with the step wiper 104 which is adapted to connect with the step conductor 106. Only one trunk line has been shown accessible to the switch but it will be understood that there are a plurality of similar trunk lines leading to equipment identical to the one shown in Fig. 2. The switch is an ordinary rotary switch having a rotary magnet 97, a stepping relay 94 and a switching relay 87. Its operation is as follows:

When relay 32 operates in response to the closure of the transmitter it attracts its armature 35, thereby closing a circuit for the relay 40 (which has been traced previously) and for the stepping relay 94, from battery, winding of relay 94, interrupter springs 98, which are controlled by the rotary magnet 97, resting contact and armature 90, make contact and armature 35, to ground. Relay 94 operates in this circuit and closes its armatures 95 and 96. At armature 96 the winding of the rotary magnet is directly connected to the ground supplied through armature 35 of relay 32; this circuit, it will be seen, extends by way of armature 90 of the switching relay 87. The circuit for the rotary magnet 97 will be effective if the wipers are in engagement with a busy trunk line. A busy trunk line is one already taken into use by a switch associated with the central equipment such as shown in Fig. 1. If this is the case there is direct ground connected to the conductor 105 in a manner which will be explained subsequently, and, accordingly, this ground extends by way of the private wiper 103, closed armature 39 and its make contact, to the lower winding of the switching relay 87 which is also connected to ground. Therefore the switching relay 87 is prevented from operating and keeps its armature 90 in the position shown in the drawings. As a consequence, the rotary magnet 97 is actuated in the circuit described above which extends over the armatures 96 and 90 to ground on armature 35. The wipers 100 to 104, inclusive, are advanced to the next set of bank contacts to which is connected another trunk line comprising conductors such as indicated by reference characters A, B, C, 105 and 106. If this second trunk line is also busy the switching relay 87 is again prevented from operating due to ground on conductor 105 and the rotary magnet 97 operates again, to advance the wipers into engagement with the next trunk line. It may be said at this point that the intermittent operation of the rotary magnet 97 is effected by the stepping relay 94 whose circuit is opened whenever the rotary magnet actuates and attracts the armature 98. Relay 94, therefore, deenergizes whenever the rotary magnet actuates and releases its armatures 96 and 95, thereby disconnecting the rotary magnet from the circuit. Accordingly, the rotary magnet deenergizes also, again closing its armature 98 to energize relay 94 which in turn reconnects the winding of the magnet 97 to the circuit. Thus the advance of the switch is effected through the intermittent action of relay 94 in conjunction with the rotary magnet 97.

When the wipers 100 to 104, inclusive, are advanced into engagement with an idle trunk line which is assumed to be the one shown in Fig. 1 and comprising the conductors C, B, A, 105, and 106, no ground will be encountered on conductor 105, but instead, battery will be encountered on this conductor by way of resistance 107 shown in Fig. 2. A circuit is therefore closed for the lower winding of switching relay 87. This relay operates its armature 91, thereby locking itself in actuated position from battery, upper winding, make contact and armature 91, make contact and armature 35 to ground. At armature 92 the relay 87 connects direct ground to the wiper 103 by way of armature 39, thereby busying the trunk line; at armature 93, the relay 87 connects the winding of relay 80 directly to the step conductor 106 by way of the wiper 104; at armature 90, the rotary magnet and the stepping relay 94 are disconnected; and at armatures 88 and 89, ground and battery, respectively, are connected to the wipers 47 and 48 of switch 45 by way of resistances 66 and 68.

The purpose of connecting battery and ground, respectively, to these wipers will be explained presently in detail. However, it may be said at this point that the wipers 47 and 48 have access to various control conductors and to the oppositely located strips of contacts in the various groups in the transmitter. Therefore, when switch 45 advances its wipers 47 and 48, ground and battery will be connected progressively to various control conductors and to the contacts in the transmitter.

It will be seen that the wipers 47, 48, and 46 are normally in engagement with the first bank contacts. The first bank contact on which wiper 47 is standing is cross-connected to the conductor 12 by means of a jumper wire designated by numeral 4. This conductor in turn is connected to the winding of relay 75 by way of armature 42. Since wiper 47 carries ground, and since the winding of relay 75 is connected to the mid point of the battery, the relay 75 will operate and actuate its armatures 76 and 77, thereby joining the control conductors C and A and connecting them by way of armature 42 to the wiper 47. Ground connected to the conductors C and A, it will be remembered, signifies that the numeral 4 is to be transmitted to the adding machine and to the tabulator.

Before continuing the detailed description, attention is called to the cross-connection designated by numeral 3 which connects the second bank contact accessible to wiper 47 to the conductor 13, which is connected to the winding of relay 70. Therefore, when switch 45 advances its wipers to second position, ground will be connected to the relay 70 which will operate and attract its armatures 71 and 72, thereby joining the control conductors A and B and connecting these conductors to ground supplied over wiper 47. Ground on the conductors A and B, however, signifies that the numeral 3 is to be transmitted to the adding machine and to the tabulator. Therefore, before any of the combinations set up by the various tickets inserted into the transmitter can be transmitted, the number 43 will be transmitted. This number is assumed to be the number of the department in which the sales clerk works. It will be obvious that the conductors terminating in the second and in the first bank contacts accessible to wipers 47 and 48 may be cross connected in any desirable manner to the conductors 12, 13, 14, 15, and 16. Therefore, any department number may be transmitted to the tabulator and to the adding machine preparatory to transmitting combinations determined by the various tickets inserted into the transmitter.

Referring to Fig. 2, the effect of seizing the trunk line individual to the equipment shown in this figure, will now be discussed in detail. It will be remembered that, upon the operation of the switching relay 87, ground will be connected to the wiper 47 which is in engagement with the first bank contact and by the jumper wiper designated 4 with the winding of relay 75. Therefore relay 75 has operated and connected ground to the conductors C and A. The armature 93 was operated by the switching relay 87 and connected the winding of relay 80 to the step conductor 106. The relay 80 is connected to battery, and, tracing the conductor 106, it will be seen that this conductor terminates in relay 150 and that the other terminal of relay 150 is wired to a resting contact of armature 158 and to ground. Therefore, the relay 150 in the control equipment of the tabulator and adding machine and relay 80 in the control equipment shown in Fig. 1 will operate.

The relays 111, 112, and 113 are polarized relays having armatures 114, 115, and 116, respectively. Each of these relays is connected to the mid point of a battery and its other terminal is connected to the various control conductors C, B, and A, respectively. In normal position, these relays maintain their armatures in the positions as shown in the drawings. If ground is connected to any of these relays over one of the corresponding control conductors, the relay will attract its armature in such a manner as to close a circuit indicated by plus or minus at the various armatures; that is to say, if ground were connected to the control conductor C, for example, the relay 111 will actuate its armature 114 to close a circuit from ground, conductor 119, winding of relay 120 to battery. If battery were connected to the control conductor C, the relay 118 would have been operated over the armature 114.

Since ground is connected to the control conductors C and A, the relays 111 and 113 will have attracted their armatures in the plus direction, and will have operated the relays 120 and 128, respectively. With these relays in operated position, the control circuit for actuating the magnet 4 in the adding machine and the magnet 4 in the tabulator is prepared. This circuit may be traced from battery, magnet 4 of the tabulator, in multiple with the magnet 4 of the adding machine, to armature 136. This armature is attracted since relay 120 is in operated position and the magnets 4 of the adding machine and of the tabulating machine are therefore connected to the resting contact and armature 133 of relay 124. Relay 124 is in resting position, therefore, the magnets 4 are connected to the make contact of armature 129 of relay 128 which is in actuated position, thereby having switched the magnets 4 of the tabulator and of the adding machine to the conductor 165.

Returning now to the operation of relay 150 in response to connecting battery to the conductor 106, it will be seen that armature 151 is attracted and has closed a circuit for the slow acting relay 152. This relay attracts its armature 153, thereby closing a circuit for the relay 163 from ground, off-normal springs on the adding machine which are designated by numeral 165', armature and make contact 153, armature and resting contact 156, winding of relay 163, to battery. Relay 163 attracts its armature 164, thereby closing the operating circuit for the tabulator magnet and for the adding machine magnet from ground, winding of relay 161, make contact and armature 164, conductor 165, and the circuit previously traced for the multiply connected magnets 4 of the adding machine and of the tabulator. The magnets 4 will therefore be attracted. The magnet 4 of the adding machine will cause the numeral 4 to appear on a tape, while the magnet 4 on the tabulator machine will punch the numeral 4 on a card.

Due to the operation of relay 161 in the control circuit of the magnets of the tabulating machine and of the adding machine, armature 162 was attracted and closed a circuit for the slow acting relay 159. This relay closes an obvious circuit at its armature 160 for the operation of relay 155; and this latter relay in turn disconnects the relay 163, at its armature 156, and disconnects the circuit of relay 150 which extends by way of the control conductor 106. The disconnection of relay 163 causes the opening of armature 164 and therefore the opening of the control circuit for the magnets 4 of the tabulator and of the adding machine; and the opening of armature 158 causes the release of relay 150. After a while, relay 152 will release and open the armature 154; however, relay 155 which was operated by relay 159 will have opened its armature 156 and connected itself to a locking circuit independent of armature 160 of relay 159. A slow action will result, therefore, keeping the armatures 158 and 156 open and thereby preventing a premature energization of relay 163 when the new combination arrives.

Tracing now the circuit extending over the conductor 106 to Fig. 1, it will be remembered that this circuit was interrupted at armature 158 upon the energization of relay 155. Accordingly, relay 80 in the control circuit shown in Fig. 1 deenergizes. However, while this relay was energized a circuit was completed for the magnet 49 of the switch 45 which circuit may be traced from ground, armature 86 and its resting contact, make contact and armature 81, conductor 51, wiper 46, make contact and armature 34, make contact and armature 36, conductor 53, winding of the rotary magnet 49 to battery. Now, when this circuit is interrupted at armature 81 by the deenergizing relay 80, the magnet 49 releases and advances the wipers 46, 47, and 48 to the second bank contacts. Ground is thereby connected over the wiper 47 to the jumper cross connected to conductor 13 and over armature 43 to the winding of relay 70 which is connected to the mid point of the battery. Accordingly, this relay energizes and actuates its armatures 71 and 72 connecting ground to the control conductors A and B. Relay 75 which was energized in the first position of switch 45 releases, because the wiper 47 leaves the position in which it is shown in the drawings, and makes contact with the terminal leading to the jumper wire 3. Ground connected to the control conductors A and B, it will be remembered, signifies that numeral 3 shall be transmitted to the tabulating and to the adding machine.

The polarized control relays 112 and 113 in Fig. 2 will operate in the plus direction and thereby actuate the relays 124 and 128. The control relay 111 will deenergize and restore its armature 114 into the position shown in the drawings, thereby deenergizing the relay 120.

After a certain interval, depending on the time necessary for deenergizing relay 152, the locking circuit for relay 155 will be opened at armature 154 and this relay will deenergize, reconnecting at its armature 158 the relay 150 to the control conductor 106 and reconnecting at its armature 156 the relay 163. Ground being again supplied to the conductor 106, the relay 80 shown in Fig. 1 will again operate, closing the previously traced circuit for the rotary magnet 49; and the relay 150 will operate to prepare the actuation of the control magnets 3 of the adding machine and of the tabulator. Upon the operation of relay 150, relay 152 is again operated as before, preparing the locking circuit for relay 155 and closing the circuit for relay 163 at its armature 153. Relay 163 therefore operates again, closing its armature 164 and thereby completing the circuit for actuating the magnets 3 of the tabulator and of the adding machine over conductor 165 in series with the winding of relay 161, armature 129 and its make contact (relay 128 being in operated position since the magnet 113 has operated in its plus direction), armature 133 and its make contact (relay 124 being in operated position since the control magnet 112 has operated in its plus direction), and magnets 3 of the adding machine and of the tabulator in parallel to battery.

The various relays shown in the upper right hand corner of Fig. 2 actuate again in the manner previously explained to release the relay 163 and to actuate the relay 155 which locks to ground at armature 154. Therefore, ground is again disconnected from the relay 150 and from the control conductor 106 causing the relay 80 in Fig. 1 to deenergize and to open the circuit for the rotary magnet 49 to advance the wipers of switch 45 into engagement with the third bank contacts. These contacts are designated by numeral 1, and are connected to correspondingly designated oppositely located strips of contacts in the upper and lower part of the transmitter. These strips of contacts belong, it will be remembered, to the group reserved for the ticket of the sales person. The upper strips are insulated completely by the perforated ticket, while the lower strip is exposed at the point designated by a heavy circle and marked with numeral 2. The wiper 47 therefore connects ground to this contact designated by numeral 2, which ground will be transmitted to the conductor 14 by means of a horizontal contact-carrying bar in the companion housing of the transmitter which is closed. Ground on conductor 14, it will be seen, is connected by way of armature 44 of relay 40, to the wiper 100 and then to the control conductor C. Ground on the control conductor C signifies that the numeral 2 will be transmitted to the equipment shown in Fig. 2.

However, before describing the action of transmitting numeral 2 to the tabulator and to the adding machine, the circuit of the rotary magnet 49 when interrupted for the last time to advance the wipers 46, 47, and 48 into engagement with the third bank contact will be traced in detail. It will be remembered that this circuit included wiper 46 while this wiper was resting on its first bank contact which is wired to the make contact of armature 34. However, when the wiper 46 leaves the first bank contact it establishes connection with the multiply connected bank contacts which are finally wired to conductor 54. Therefore, when the switches advance from position 2 to position 3 the circuit for the rotary magnet 49 extends from ground, armature and resting contact 86, armature 81, (which is opened upon the deenergization of relay 80) conductor 51, wiper 46, second bank contact multiply connected to the conductor 54, make contact at armature 36, conductor 53, winding of rotary magnet 49 to battery. Thus, in the second and all subsequent positions of the switch 45, the circuit for interrupting and energizing the rotary magnet 49 extends as traced above. The rotary magnet 49 will be energized whenever the relay 80 operates in response to the operation of the equipment shown in Fig. 2 and the advance of the wipers 46, 47, and 48 will be effected whenever the relay 80 deenergizes in response to the disconnection of ground at armature 158 in Fig. 2.

As a result of the wiper 47 of switch 45 having been connected to the third bank contact, which is designated by numeral 1, ground is supplied to the contact row designated by numeral 1 in the transmitter at the point marked by numeral 2 and this ground is further transmitted over conductor 14 and armature 44 to the wiper 100 which is in engagement with the control conductor C. Therefore, the control relay 111 in Fig. 2 will operate in plus direction and will actuate the relay 120 over the conductor 119. Depending on the interaction of the various relays shown in the right hand upper corner of the drawing, ground will again be connected to the relay 150 and therefore to the control conductor 106, energizing relays 150 in Fig. 2 and 80 in Fig. 1.

The energization of relay 80, as will be remembered, causes the operation of the rotary magnet 49 to prepare the same to advance the wipers again upon the subsequent deenergization of relay 80, and the operation of relay 150 causes the operation of relay 152 which in turn closes the circuit for relay 163 at its armature 153, in the usual manner. Relay 163 actuates its armature 164 to connect ground to the control conductor 165 by way of winding of relay 161, and, since relay 120 is now in operated position, this ground will be transmitted to the magnets 2 of the adding machine and of the tabulator from conductor 165, armature 129 and its resting contact, armature 131 and its resting contact, armature 134 and its resting contact, armature 138 and its make contact, magnets 2 of the adding machine and of the tabulator in multiple to battery.

The action of transmitting the combinations determined by the salesman's ticket as indicated in the transmitter on the right hand group designated by numerals 1, 2, and 3, will be completed in this fashion, the combination for transmitting numeral 5 following the transmission of numeral 2 and the combination for transmitting numeral 1 following the transmission of numeral 5 in the above described manner.

At the moment of transmitting the last figure in the salesman's number, the switch wipers 47 and 48 are in engagement with the contacts designated by numeral 3. When this combination is transmitted, having actuated the corresponding magnets of the adding machine and of the tabulator, the circuit for rotary magnet 49 of switch 45 will again be interrupted through the deenergization of relay 80 and the wipers 46, 47, and 48 will leave the bank contacts designated 3 and will engage the next bank contacts. Thereby, battery will be connected to the conductor 74 by way of wiper 48, bank contact following the one designated 3, conductor 74; and ground will be connected to conductor 73 by way of wiper 47, bank contact following the one designated by numeral 3, and conductor 73. Following the conductors 73 and 74 it will be seen that these conductors are now connected to the wipers 101 and 102 which are in engagement with the control conductors A and B. Therefore, the control conductors A and B will be connected to ground and to battery, respectively.

Ground on conductor A and battery on B, however, signifies that the non-add magnet of the adding machine is to be operated. That is to say, the non-add magnet of the adding machine will be operated to designate that the columns just transmitted (consisting of the department No. 43 and the salesman's No. 251) shall not be added up.

The actuation of the non-add magnet will now be explained. When ground is connected to the control conductor A, the control relay 113 will be actuated in the plus direction and will close a circuit for the relay 128; and when battery is connected to the control conductor B, the polarized control relay 112 will be actuated in the minus direction and will thereby actuate the relay 122. With the relays 128 and 122 in actuated position a circuit may be traced from the control conductor 165, armature 129 and its make contact, armature 133 and its resting contact, armature 136 and its resting contact, armature 140 and its make contact, non-add magnet of the adding machine to battery. This circuit will be interrupted in the usual manner and ground will finally be disconnected from the control conductor 106 to deenergize the relay 80 shown in Fig. 1, and to thereby advance the wipers of the switch 45 into engagement with the next bank contacts.

When the wipers 47 and 48 have arrived on the next bank contacts, the condition will be reversed, that is to say, battery will be connected to the control conductor A, and ground will be connected to the control conductor B. This combination of current on the control conductors A and B will cause the control relay 113 to actuate in its minus direction and operate relay 126, while the control relay 112 will be operated in its plus direction and actuate the relay 124. With the relays 126 and 124 in operated position, a circuit will be closed upon the operation of relay 163, for the actuation of the motor magnet of the adding machine from ground, winding of relay 161, make contact and armature 164, conductor 165, armature 132 and its make contact, armatures 141, 143, and 135, the last in its operated position, motor magnet of the adding machine to battery. The motor magnet will actuate to print the numerals set up, and will prepare the adding machine for receiving another series of numerals.

The switch 45 will then progressively advance its wipers 46, 47, and 48 into engagement with the bank contacts designated 4 to 8, inclusive. These bank contacts, accessible to wiper 48 are connected, as will be remembered, to the correspondingly designated strips of contacts in the upper part of the transmitter, while the bank contacts 4 to 8, inclusive, accessible to wiper 47 are connected to the correspondingly designated contact strips in the lower part of the transmitter. These oppositely located contact strips 4 to 8, inclusive, in the transmitter represent the group of contacts reserved for receiving the customer's ticket or the cashier's ticket as was explained previously. The perforations in this ticket are marked by numerals 1 to 5, inclusive, and are shown in heavy circles.

The switch wipers 47 and 48 of switch 45 will connect ground and battery, respectively, to the strips of contacts 4 to 8, inclusive, and thereby the combination set up by this perforated customer ticket will be transmitted to the adding machine and to the tabulator in the same manner as was described in connection with the transmission of the combination set up by the clerk's ticket.

The switch wipers 47 and 48 will leave the bank contacts 8 after the combination set up by the customer's ticket is transmitted and will engage the contacts following contact 8. Thereby ground will again be connected to the control conductor A and battery will be connected to the control conductor B. This current combination will again cause the operation of the non-add magnet in the adding machine. Upon the next step, battery will be connected to the control conductor A and ground to the control conductor B for actuating the motor magnet in the adding machine to print the number designated by the customer's ticket, and to prepare the adding machine for receiving the next series of figures.

The wipers 47 and 48 will then engage the contacts designated by numeral 9 which are respectively connected to the upper and lower strips of contacts in the transmitter. These strips of contacts belong to the group reserved for receiving the ticket which the salesman detaches from the article sold to the customer. This ticket has perforations designated by heavy circles, and the information rendered by these perforations is divided into two parts, e. g., the first part comprising the contact strips 9 to 13, inclusive, in the upper and lower section of the transmitter, designates the price of the article, and the contact strips 14 to 18, inclusive, designate the serial number of the article.

The switch 45 will advance its wipers in the usual manner progressively over bank contacts 9 to 13, inclusive, thereby transmitting the first part of the information determined by the merchandise ticket. The wipers will then engage the contacts located between the bank contacts designated 13 and 14. Ground will thereby be connected in an obvious manner to the control conductor designated B and battery will be connected to the control conductor A. This combination, as will be remembered, causes the operation of the motor magnet alone of the adding machine for printing the received figures and for preparing the adding machine as usual. Obviously, since the non-add magnet is not being operated in this combination, the adding machine will record this last received information so that it may be added up to the sales total.

The switch wipers are then progressively advanced over the bank contacts designated 14 to 17 to convey to the tabulator and to the adding machine the information determined by the second part of the merchandise ticket. When the wipers 47 and 48 leave the bank contacts designated 17 they engage conductors terminating in the wipers 57 and 58 of switch 55. These wipers are normally in engagement with bank contacts wired to the upper and lower strips of contacts in the transmitter which are designated by numeral 18. The ground and battery supply on wipers 47 and 48 will therefore be conveyed to wipers 57 and 58, respectively, which now take the place of wipers 47 and 48.

When the last information determined by the merchandise ticket is transmitted, the circuit for relay 80 in Fig. 1 is again opened. At this time, however, the opening of relay 80 and the release of armature 81 is not effective to the magnet 49 of the switch 45 but to the rotary magnet 59 of the switch 55. Rotary magnet 59 actuates immediately upon closure of the circuit by way of armature 81 preparatory to actuating the adding machine and the tabulator for the last information on the merchandise ticket which circuit may be traced from ground, armature 86 and its resting contact, make contact and armature 81, conductor 51, wiper 46, bank contact connected to conductor 64, make contact and armature 33, conductor 63, winding of the rotary magnet 59 to battery.

It is obvious that when relay 80 deenergizes after the last information is transmitted, the circuit for the rotary magnet traced above, will be opened and, accordingly, magnet 59 deenergizes to advance its wipers 56, 57, and 58 into engagement with the second bank contacts. Ground will therefore be connected to the control conductor C and battery will be connected to the control conductor A. This current combination transmitted to the control relays 111 and 113 will cause the operation of relays 126 and 120, thereby preparing circuits for the operation of the trip magnet of the tabulator in multiple with the ADC magnet of the adding machine.

The actuation of the trip magnet of the tabulator causes the ticket to be completely punched and expelled from the tabulator while the energization of the magnet ADC in the adding machine causes the operation of a key to add the last received information in a different column. It will be evident that the last information has the purpose of keeping a perpetual unwritten inventory.

The switch wipers 57 and 58 will then be progressively advanced into connection with the third and fourth bank contacts. When in engagement with either of these contacts, it will be seen that battery will be connected to the control conductor A and ground to conductor B. Therefore, the motor magnet of the adding machine will be actuated twice in succession in a manner already explained in detail. The first operation will cause the number set up last to be printed on the tape, and the second operation of the motor magnet will advance the tape idly to provide a space between the group of information just transmitted, and a subsequent group to be transmitted when a salesman transacts another sale.

After the motor magnet of the adding machine is operated for the last time, the rotary magnet 59 of switch 55 will be operated again upon the deenergization of relay 80, advancing the wipers 57 and 58 into engagement with the bank contacts connected to the conductors 108 and 109, respectively. Ground and battery will thereby be connected to these conductors to energize the release relay 85. This relay operates its armature 86, thereby connecting ground to conductor 18, which terminates in the release relay 24 of the transmitter. Relay 24 operates to attract its armature 25 thereby releasing the cam 30 and with it the shaft 31 to move in the direction indicated by the arrow. The companion cover of the transmitter which locks the marker ticket in place is thereby released and the salesman has again access to the marker tickets and may withdraw them from the transmitter. The transmission is now completed.

The release of the mechanism to normal takes place immediately after the energization of relay 85 and is effective as follows: Relay 32 deenergizes due to the opening of the springs 28 and 27 when the transmitter is restored to normal. Armature 39 opens to remove ground from the control conductor 105 of the trunk line leading to the tabulator and adding machine units; armatures 37 and 38 restore the normal connection of relay 32 to the conductors 15 and 16; armature 36 prepares a circuit for automatically restoring the switch 45 to normal; armature 35 removes ground from the upper winding of switching relay 87 and armatures 33 and 34 prepare circuits for restoring the switch 55 to normal position.

Upon the deenergization of relay 87, the circuit for the switch comprising wipers 100 to 104, inclusive, are restored to normal position at armatures 90, 91, and 92; and ground and battery supplies are removed from the wipers 47 and 48 at armatures 88 and 89. The rotary magnets 49 and 59 of switches 45 and 55 receive an impulse from ground, armature and resting contact 35, armature and resting contact 34, conductor 64, wipers 46 and 56, where the circuit divides over conductors 51 and 61, respectively, to the rotary magnets 49 and 59. Specifically, the circuit for the rotary magnet 49 extends from conductor 51 over the interrupter springs 50, resting contact and armature 36 to the winding of the rotary magnet 59; and the circuit for the rotary magnet 59 extends from conductor 61, interrupter spring 60, conductor 62, resting contact and armature 33, winding of rotary magnet 59 to battery. The rotary magnet 49 advances the wipers 46, 47, and 48 one step into the position shown in the drawings, while the rotary magnet 59 advances the wipers 56, 57, and 58 by one step into connection with the next following contacts. Wiper 58 is thereby again connected to contact 18, leading to the correspondingly marked contact strips in the upper section of the transmitter; wiper 57 is advanced into connection with the contact 18, leading to the correspondingly marked contact strips in the lower section of the transmitter; and wiper 56 is advanced into connection with the normal contacts in the corresponding bank which is the sixth bank contact.

It will be understood from the above explanation that the switch 55 has five normal positions. These normal positions are designated in the uppermost bank accessible to wiper 56 by contacts not multipled with the other contacts; in the banks accessible to wipers 57 and 58 these normal positions are designated by numeral 18 which, it will be understood, are multipled five times. The second to fifth bank contacts accessible to wipers 57 and 58 are of course, similarly multipled in these banks.

What is claimed is:
1. An automatic auditing system, comprising a transmitter, a plurality of marker members each bearing certain information, means for immovably attaching said members to said transmitter, a tabulating machine remotely located from said transmitter, mechanism for operating said machine to reproduce on a single ticket the information furnished by said members attached to said transmitter, and a step-by-step switch associated with said transmitter for successively transmitting the information in the members attached to the transmitter to control said machine while the members are held stationary.

2. An auditing system, comprising a plurality of transmitting stations each having a transmitting device, a plurality of remotely located tabulating machines, a plurality of variably marked tickets for insertion in a transmitting device, means for automatically selecting an idle tabulating machine and for connecting said machine to said transmitter, and means for operating said tabulator to reproduce on a single ticket the information contained in said tickets attached to said transmitter, and for operating said tabulator to indicate on said single ticket the particular station transmitter in use.

3. An auditing system, comprising a transmitter and control mechanism, a remotely located tabulating machine, means for setting said transmitter according to a plurality of informatory data, an automatic switch for then connecting said control mechanism and transmitter to said remotely located machine, and apparatus for then operating said machine to record the transmitter connected therewith and to record said informatory data graphically on a single ticket.

4. An automatic auditing system comprising a transmitter, a plurality of tickets each having predetermined perforations rendering certain information, means for attaching said tickets to said transmitter in a certain manner, a plurality of tabulating machines, means for automatically selecting an idle tabulating machine after said tickets are attached to said transmitter, and means for then actuating said machine to coordinate the information on said plurality of tickets on a single ticket and to register an indication corresponding to the particular transmitter used on said single ticket.

5. An automatic auditing system, comprising a transmitting device having a plurality of groups of contacts, a plurality of tickets each having a plurality of perforations rendering certain information, means in said transmitter for receiving said tickets according to said groups, means in said transmitter having a plurality of groups of contacts for setting up contact combinations determined by the perforations in said tickets, a plurality of tabulating machines, means for automatically selecting an idle one of said machines after said combinations are set up, means for actuating said machine to duplicate the perforations in said tickets on a single ticket, and means operated for indicating that said information has been duplicated.

6. An automatic auditing system, comprising a transmitting device, a plurality of marked tickets for insertion into said device, means for locking said tickets in place if properly inserted, means for visually indicating if said tickets are improperly inserted, means for releasing said locking means to reinsert said tickets properly, an automatic switch, a plurality of remotely located recording machines, means for automatically operating said switch responsive to the locking of properly inserted tickets to select an idle recording machine, means for then operating said machine to record the marked information on said tickets on a single card, and means for then releasing said tickets.

7. An automatic auditing system, comprising a transmitting device, a plurality of variable marked tickets for insertion into said device, means for locking said tickets to prevent withdrawal of the same, a plurality of remotely located recording apparatus, trunk lines leading to said apparatus, each trunk line comprising three control conductors, an automatic switch, means for operating said switch responsive to the actuation of said locking means to select an idle one of said trunk lines, an automatic switch for progressively transmitting current combinations over said control conductors as determined by said marked tickets, a variably operable relay connected to each of said control conductors and responsive to said combinations, means actuated by said relays for progressively operating said recording apparatus to reproduce the information contained on said tickets on a single card and means for then releasing said locking mechanism to permit withdrawal of said tickets.

8. An automatic auditing system, comprising a transmitter, a plurality of variably marked tickets for insertion into said transmitter, means for locking said tickets in place, a plurality of remotely located recording apparatus, trunk lines individual thereto and each comprising three control conductors terminating in three variably operable relays, respectively, an automatic switch, means for operating said switch responsive to said locking means to select an idle trunk line, means for automatically transmitting certain current combinations over said control conductors to actuate said relays in a definite manner independent of the tickets inserted in said transmitter, means for then transmitting current combinations over said control conductors to actuate said relays in a manner determined by said tickets, and means actuated by said relays for progressively operating said recording apparatus to record the information transmitted by said current combinations on a single card.

9. An automatic auditing system, comprising a plurality of transmitting devices for receiving non-coordinated information, a plurality of receivers remote from said devices for receiving said information and for coordinating the same graphically on a single card, switching means for automatically connecting a transmitting device in use with any idle one of said receivers, and control mechanism including a control switch having contacts marked by the transmitter and relays for progressively transmitting said non-coordinated information to said receiving apparatus in accordance with the marked contacts.

10. An automatic auditing system using marker tickets each designating a definite information, a device for receiving a plurality of marker tickets and for locking the same in place, recording apparatus, switching means for automatically connecting said device with said recording apparatus, control mechanism for progressively transmitting the information on said marker tickets to said recording apparatus, means actuated thereby for recording said information graphically on a single card, and means for then unlocking said device to release said marker tickets.

11. An automatic auditing system using marker tickets each designating a definite information, a transmitter for receiving a plurality of said marker tickets, a plurality of recording apparatus, trunk lines individual thereto and each comprising three control conductors, means for connecting a transmitter to a recording apparatus over a trunk line, means for progressively transmitting current combinations over said three control conductors as determined by said tickets, and means actuated thereby for operating said recording apparatus to reproduce the information on said marker tickets on a single ticket.

12. An automatic auditing system using marker tickets each designating a definite information, a transmitter for receiving a plurality of said marker tickets, a plurality of recording apparatus, means for connecting said transmitter to an idle recording apparatus, means for progressively transmitting current combinations to said recording apparatus independent of said transmitter, means for progressively transmitting current combinations to said recording apparatus under the control of said transmitter containing said tickets, and means responsive to said current combinations for actuating said recording apparatus to record the received information graphically on a single card.

13. An auditing system, comprising a transmitting device, a plurality of marked tickets for insertion into said device, a recording machine, means for locking said tickets in place if properly inserted, means responsive thereto for automatically operating said machine to make a record of the information on said tickets, and means for thereafter releasing said tickets.

14. An auditing system, comprising a transmitting device, a plurality of marked tickets for insertion into said device, a recording machine, means for locking said tickets in place if properly inserted, means responsive thereto for automatically operating said machine to make a record of the information on said tickets, means for thereafter releasing said tickets, and means for preventing the operation of said machine in case said tickets are improperly inserted in said device.

15. An auditing system, comprising a transmitting device, a plurality of marked tickets for insertion into said device, a recording machine, means for locking said tickets in place if properly inserted, means responsive thereto for automatically operating said machine to make a record of the information on said tickets, means for thereafter releasing said tickets, means for preventing the operation of said machine in case said tickets are improperly inserted in said device, and means responsive thereto for indicating the improper insertion of said tickets.

16. An auditing system, comprising a transmitting device, a plurality of marked tickets for insertion into said device, a recording machine, means for locking said tickets in place if properly inserted, means responsive thereto for automatically operating said machine to make a record of the information on said tickets, means for thereafter releasing said tickets, means for preventing the operation of said machine in case said tickets are improperly inserted in said device, means responsive thereto for indicating the improper insertion of said tickets, and means for then releasing said tickets only in case the same have been improperly inserted in said device.

17. In an auditing system, comprising a transmitting device, a plurality of marked tickets for insertion into said device, a recording machine, means for locking said tickets in said device when placed therein to prevent withdrawal of the same, means responsive thereto in case the tickets are properly inserted for automatically operating said machine to make a record of the information on the tickets, a release magnet having means for controlling the release of said locking means, and two separate circuits for energizing said release magnet to release said locking means, one of said circuits manually effective to be closed only if said tickets are improperly inserted in said device and the other of said circuits automatically effective to be closed only after the operation of said machine when said tickets are properly inserted.

18. In an electrically operated accounting system, the combination with a plurality of perforated cards, a circuit closer having means for simultaneously preparing a plurality of circuits in accordance with the perforations in said cards when placed therein, and a switch operated responsive to the operation of said circuit closer to successively close said prepared circuits.

19. In an electrically operated accounting system, the combination with a plurality of marked cards, a circuit closer having means for simultaneously preparing a plurality of circuits in accordance with the marks in said cards when placed therein, a switch operated responsive to the operation of said circuit closer to successively close said prepared circuits, a plurality of recording machines adapted to be operated in accordance with said successively closed circuits, and means for automatically connecting an idle recording machine with said circuit closer and switch whereby said machine is operated responsive to said successive circuit closures to mark a single card in accordance with the marks in said plurality of cards.

20. In an accounting system, a statistical machine for making statistical records, electromagnetic means for controlling the operation of said machine, a plurality of circuit combinations for controlling the operation of said electromagnetic means, a circuit closer comprising means for simultaneously preparing a plurality of said circuit combinations, and a switch operated step-by-step responsive to the operation of said circuit closer for successively completing the said prepared circuit combinations to operate said electromagnetic means to control said machine to make a record in accordance with the said completed circuit combinations.

21. In an accounting system, a recording machine, a plurality of record cards having marks therein, a transmitter for holding said plurality of cards, means responsive to the placing of said cards in said transmitter for transmitting impulses in code in accordance with the marks in said cards, and decoding means operated responsive to the transmission of said coded impulses for operating said machine to duplicate the marks in said plurality of cards in a single card.

22. In an automatic auditing system, a transmitter including a step-by-step code sending switch, a statistical machine, magnets for controlling the actuation of said machine, a decoding device individual to said magnets, means for connecting said transmitter with said device, means in said transmitter controlled by the operation of said switch for transmitting successive current combinations over said connection to said device, and means in said device operated responsive to said successive combinations for operating successive ones of said magnets to operate said machine in accordance with said combinations.

23. An automatic auditing system, comprising a transmitter, a plurality of variably marked tickets for insertion into said transmitter, a recording device, a trunk line individual to said device comprising three control conductors, means for automatically transmitting certain current combinations over said control conductors to operate said device in a definite manner independent of the marks in the tickets in the transmitter, and means for then transmitting current combinations over said control conductors to operate said device in a definite manner dependent upon the marks in said tickets.

24. An automatic auditing system, comprising a transmitter, a plurality of variably marked tickets for insertion into said transmitter, a recording device, means for automatically transmitting certain current combinations to said device in a definite manner independent of the transmitter and the marks in the cards in the transmitter, means for then transmitting current combinations to said device in a definite manner dependent upon the marks in said tickets in said transmitter, and means for operating said device to record the information transmitted by the current combinations.

25. In a transmitter comprising a circuit closer and an automatic step-by-step switch, a plurality of stationary contacts in said circuit closer divided into groups, a like plurality of movable contacts adapted to make electrical connection with corresponding ones of said stationary contacts, a conductor connecting each group of stationary contacts to a switch bank of said switch, means for causing only predetermined ones of said movable contacts to make electrical connection with their corresponding stationary contacts, means responsive thereto for initiating the operation of said switch, means in said switch for successively engaging said conductors, and means responsive to said successive engagements for transmitting current combinations in accordance with and determined by said predetermined engagements.

26. In a transmitter comprising a circuit closer and an automatic step-by-step switch, a plurality of stationary contacts in said circuit closer divided into groups, a like plurality of movable contacts adapted to make electrical connection with corresponding ones of said stationary contacts, a conductor connecting each group of stationary contacts to a switch bank of said switch, means for causing only predetermined ones of said movable contacts to make electrical connection with their corresponding stationary contacts, means responsive thereto for initiating the operation of said switch, means in said switch for successively engaging said conductors, means responsive to said successive engagements for transmitting current combinations in accordance with and determined by said predetermined electric connections, and means responsive to the operation of said switch for transmitting certain current combinations independent of said predetermined electric connections.

27. In a transmitter comprising a circuit closer and an automatic step-by-step switch, a plurality of stationary contact strips in said circuit closer, a plurality of movable contacts in said circuit closer arranged in rows opposite the strips and each contact in a row conductively connected, said rows arranged in a transverse direction to the strips so that only one contact in each row can make electrical connection with one of the strips, a conductor connecting each strip to a switch bank of said switch, means for causing only predetermined ones of said contacts to make electrical connection with the opposed strips, means responsive to such electrical connections for initiating the operation of said switch, a wiper in said switch for successively engaging said conductors, and means responsive to said successive engagements for transmitting current combinations in accordance with and determined by said predetermined electrical connections.

28. In a transmitter comprising a circuit closer and an automatic step-by-step switch, a plurality of stationary contact strips in said circuit closer, a plurality of movable contacts in said circuit closer arranged in rows opposite the strips and each contact in a row conductively connected, said rows arranged in a transverse direction to the strips so that only one contact in each row can make electrical connection with one of the strips, a conductor connecting each strip to a switch bank of said switch, means for causing only predetermined ones of said contacts to make electrical connection with the opposed strips, means responsive to such electric connections for initiating the operation of said switch, a wiper in said switch for successively engaging said conductors, means responsive to said successive engagements for transmitting current combinations in accordance with and determined by said predetermined electric connections, other conductors terminating in said switch bank, and means responsive to the engagement of said wiper with said other conductors for transmitting certain current combinations independent of said predetermined electric connections.

29. In an automatic accounting system, a plurality of polarized relays each having two operating positions, a non-polarized relay for each of said positions, a statistical machine, magnets for operating said machine, means for operating said polarized relays to one or the other of their operating positions, means responsive thereto for operating the non-polarized relays in accordance with the position to which the polarized relays are operated to, and pyramided contacts and connections controlled by said non-polarized relays for operating said magnets to control said machine in accordance with the operation of said relays.

30. An auditing system comprising a transmitter, an associated control mechanism, a remotely located recording machine, means for operating said transmitter to set up a plurality of different markings in said control mechanism in accordance with data, an automatic switch responsive to the operation of said transmitter for then connecting said control mechanism with said remote machine, means operated responsive to such connection for initially operating said control mechanism, and apparatus then operated responsive to the operation of said control mechanism for operating said remote machine to record said data in accordance with the markings in the control mechanism.

31. In a recording system, a transmitter, a control mechanism associated with said transmitter, a recording machine remotely located from said transmitter and mechanism, means for operating said transmitter to simultaneously set said control mechanism in a plurality of different ways in accordance with data, means responsive thereto for operating said control mechanism to successively pick up the data markings, and apparatus operated responsive to the operation of the control mechanism for operating said machine to record said data in accordance with the markings in the control mechanism.

32. In a code-sending system, a circuit closer, a step-by-step code-sending switch having two switch-banks and wipers accessible thereto, rows of contacts in the circuit closer connected to corresponding contacts in the switch-banks, each upper half of each row connected to a corresponding contact in one switch-bank and each lower half of each row connected to a corresponding contact in the other switch-bank, a trunk line associated with said switch and circuit closer having control conductors, cards having perforations therein for insertion in the circuit closer, means controlled by the positions of the perforations in the cards when placed in the circuit closer for simultaneously completing electrical connections between the contacts of the switch-banks and the contacts of the circuit closer in code combinations, means responsive thereto for operating the wipers of said switch step-by-step over the switch-bank contacts to successively pick up the coded combinations, and means responsive thereto for transmitting coded impulses over the conductors of said trunk line in accordance with said code combinations.

33. In a code-sending system, a circuit closer, a step-by-step code-sending switch having two switch-banks and wipers accessible thereto, rows of contacts in the circuit closer connected to corresponding contacts in the switch-banks, each upper half of each row connected to a corresponding contact in one switch-bank and each lower half of each row connected to a corresponding contact in the other switch-bank, a trunk line associated with said switch and circuit closer having control conductors, cards having perforations therein for insertion in the circuit closer, means controlled by the positions of the perforations in the cards when placed in the circuit closer for simultaneously completing electrical connections between the contacts of the switch-banks and the contacts of the circuit closer in code combinations, means responsive thereto for operating the wipers of said switch step-by-step over the switch-bank contacts to successively pick up the coded combinations, means responsive thereto for transmitting coded impulses over the conductors of said trunk line in accordance with said code combinations, a statistical machine, means for connecting said machine to said trunk line responsive to the insertion of said cards in said transmitter, and means for operating said machine over the conductors of said trunk line in accordance with the transmitted code combinations.

34. In a code-sending system, a circuit closer, a step-by-step code-sending switch having two switch-banks and wipers accessible thereto, rows of contacts in the circuit closer connected to corresponding contacts in the switch-banks, each upper half of each row connected to a corresponding contact in one switch-bank and each lower half of each row connected to a corresponding contact in the other switch-bank, a trunk line associated with said switch and circuit closer having control conductors, cards having perforations therein for insertion in the circuit closer, means controlled by the positions of the perforations in the cards when placed in the circuit closer for simultaneously completing electrical connections between the contacts of the switch-banks and the contacts of the circuit closer in code combinations, means responsive thereto for operating the wipers of said switch step-by-step over the switch-bank contacts to successively pick up the coded combinations, means responsive thereto for transmitting coded impulses over the conductors of said trunk line in accordance with said code combinations, a statistical machine, means for connecting said machine to said trunk line responsive to the insertion of said cards in said transmitter, means for operating said machine over the conductors of said trunk line in accordance with the transmitted code combinations, and a revertive control circuit between said switch and machine whereby the step-by-step operation of said switch is controlled by the operation of said machine responsive to each transmitted code combination.

35. In a control system, a statistical machine for making statistical records, electromagnetic means for controlling the operation of said machine, a circuit closer comprising means for simultaneously preparing a plurality of circuit combinations for controlling the electromagnetic means, a switch operated step-by-step responsive to the operation of said circuit closer for successively completing the said prepared circuit combinations to operate said electromagnetic means to control said machine to make a record in accordance with the completed circuit combinations, and a revertive control circuit between said switch and machine whereby the step-by-step operation of said switch is controlled by the operation of said electromagnetic means responsive to each circuit combination.

36. In an automatic accounting system, a statistical machine for making statistical records, a step-by-step switch for transmitting successive coded impulses to said machine in successive steps, means for operating said switch in its first step to transmit its first code, electromagnetic means responsive to said codes for operating said machine, and a revertive control circuit between said switch and said machine whereby the step-by-step operation of said switch is thereafter controlled by the operation of said machine in response to each transmitted code.

37. In an automatic auditing system, a transmitter, a plurality of variably marked tickets for insertion into said transmitter, a recording device remote from said transmitter, a trunk line individual to said device comprising three control conductors, means for automatically selecting said trunk line responsive to the insertion of said tickets in said transmitter to connect said remote device to said transmitter, and means for automatically connecting potentials of one or more polarities to a plurality of said conductors in various combinations dependent upon the marks in said tickets in said transmitter to operate said device to make a record of said marks.

38. In an automatic auditing system, a transmitter, a plurality of variably marked tickets for insertion into said transmitter, a recording device remote from said transmitter, a trunk line individual to said device comprising three control conductors, and means for automatically connecting potentials of one or more polarities to a plurality of said conductors in various combinations dependent upon the marks in said tickets in said transmitter to operate said device to make a record of said marks.

39. In an automatic auditing system, a transmitter, a plurality of variably marked tickets for insertion into said transmitter, a recording device remote from said transmitter, a trunk line individual to said device comprising three control conductors, means for automatically connecting potentials of one or more polarities to a plurality of said conductors in various combinations dependent upon the marks in said tickets in said transmitter to operate said device to make a record of said marks, and a revertive control circuit between the device and said transmitter whereby subsequent connections of various combinations of polarities to said conductors as determined by the marks in said cards is dependent upon the operation of said device in response to a preceding received combination.

40. In a system for transferring data represented by markings in a card, the combination of a circuit closer having means for simultaneously preparing a plurality of circuits in accordance with the markings in said card when placed in the circuit closer, a rotating device for successively closing said prepared circuits, and a receiving device operated by said successive circuit closures to record said markings.

41. In an electrically operated accounting system, a circuit closer having a plurality of incoming circuits, a plurality of outgoing circuits, and having means for simultaneously connecting a plurality of said incoming circuits to a plurality of said outgoing circuits in any desired order in accordance with predetermined data, and a switch operated in response to the operation of said circuit closer to successively close said connected circuits.

42. In an electrically operated accounting system, a circuit closer having a plurality of incoming circuits, a plurality of outgoing circuits, and having means for simultaneously connecting a plurality of said incoming circuits to a plurality of said outgoing circuits in any desired order in accordance with predetermined data, a switch operated in response to the operation of said circuit closer to successively close said connected circuits, a plurality of statistical machines, means for automatically selecting an idle one of said machines and connecting it with said circuit closer and switch, and means for thereafter operating said machine responsive to said successive circuit closures to record said data.

43. In an accounting system, a recording machine, cards having marks therein designating data, a transmitter for holding said cards, means responsive to the placing of one of said cards in said transmitter for transmitting impulses in code in accordance with the marks in said card, and decoding means operated responsive to the transmission of said coded impulses for operating said machine to make a record in accordance with said marks.

44. In a transmitting system, a circuit closer, a switch having a switch-bank and a wiper, rows of contacts in the circuit closer connected to corresponding bank contacts in the switch bank, a trunk line associated with said switch and circuit closer, cards having marks designating data, means controlled by the positions of the marks on said cards when placed in said circuit closer for simultaneously completing electrical connections between the contacts of the switch-bank and the contacts of the circuit closer, means responsive thereto for operating the wiper of said switch over the switch-bank contacts to successively pick up the completed electrical connections, and means responsive thereto for transmitting impulses over said trunk line in accordance with said data markings.

45. A device for transmitting data comprising a sensing mechanism for simultaneously searching a plurality of positions in a plurality of columns on a sheet for perforations, a receiving device, a transmitter having a set of elements connected to the sensing mechanism, a second set of elements connected to the receiving device, said sensing mechanism when operated connecting the receiving elements to the transmitting elements through all the perforations on said sheet, and means for successively activating the two sets of elements to transmit the several data, according to the simultaneous sensing of the sheet, successively to the receiving device.

46. A system for duplicating record cards comprising a card analyzing member, a coding device controlled thereby, a decoding device, a transmitting media operatively connecting said devices, means controlled by the analyzing device for initiating timed operating relation between said devices, and perforating mechanism controlled by said decoding device.

47. In a record controlled system the combination of data designations on a controlling record, means for preparing circuits through the data designations, step-by-step circuit-closing devices for successively closing the prepared circuits column by column, coding mechanism controlled by said devices, decoding devices controlled by said mechanism, a line circuit connecting said coding and decoding devices, perforating mechanism controlled by said decoding mechanism in accordance with a predetermined code, and means controlled by the perforating mechanism for rendering the coding devices inoperative until the perforating mechanism has completed an operation under control of the decoding devices.

48. A device for transmitting data designated by perforations in a record medium having a plurality of columns, each column having a series of index point positions each of which index point positions identifies a single character, comprising devices for successively closing circuits through the perforations in said record medium column by column, a series of groups of coding contacts each corresponding to one of said index point positions, means controlled by said circuit closing devices for setting up said contacts according to the value of the index point perforation through which a circuit is closed and in accordance with a predetermined code, a transmission medium, and means controlled by said first named means for successively connecting said transmission medium to said contacts.

49. A device for coding data designations comprising a reading device for said data designations, a plurality of coding contacts arranged to be set up by said reading device, a line circuit, and means controlled by said reading device for successively connecting said line circuit to said contacts.

50. In a record card controlled machine the combination of a plurality of code devices controlled by said card and settable according to the index point value of a perforation present in said card, a cyclically operable member cooperating with said devices, and means controlled by said card for initiating the cycle of operations of said member.

MARTIN L. NELSON.